United States Patent
Chiarini (10) Patent No.: US 10,222,979 B2
(45) Date of Patent: Mar. 5, 2019

(54) SIZE ADJUSTABLE SOFT ACTIVATION TRIGGER FOR TOUCH DISPLAYS ON ELECTRONIC DEVICE

(71) Applicant: Datalogic USA, Inc., Eugene, OR (US)

(72) Inventor: Alessandro Chiarini, Bologna (IT)

(73) Assignee: DATALOGIC USA, INC., Eugene, OR (US)

( * ) Notice: Subject to any disclaimer, the term of this patent is extended or adjusted under 35 U.S.C. 154(b) by 453 days.

(21) Appl. No.: 14/960,148

(22) Filed: Dec. 4, 2015

(65) Prior Publication Data

US 2017/0160922 A1 Jun. 8, 2017

(51) Int. Cl.
*G06F 3/0488* (2013.01)
*G06F 3/0484* (2013.01)
*G06K 7/00* (2006.01)
*G06F 3/0481* (2013.01)

(52) U.S. Cl.
CPC ........ *G06F 3/04886* (2013.01); *G06F 3/0488* (2013.01); *G06F 3/04817* (2013.01); *G06F 3/04842* (2013.01); *G06F 3/04845* (2013.01); *G06F 3/04883* (2013.01); *G06K 7/0004* (2013.01)

(58) Field of Classification Search
CPC combination set(s) only.
See application file for complete search history.

(56) References Cited

U.S. PATENT DOCUMENTS

| | | | |
|---|---|---|---|
| 5,640,002 A | 6/1997 | Ruppert et al. | |
| 7,844,915 B2 | 11/2010 | Platzer et al. | |
| 8,308,069 B2 | 11/2012 | Barber et al. | |
| 8,381,118 B2 * | 2/2013 | Minton | G06F 3/04886 345/168 |
| 8,467,991 B2 | 6/2013 | Khosravy et al. | |
| 8,610,730 B1 | 12/2013 | Li et al. | |
| 8,739,035 B2 | 5/2014 | Trethewey | |

(Continued)

FOREIGN PATENT DOCUMENTS

EP 0 817 000 A1 1/1998
EP 2 148 267 A2 1/2010

(Continued)

OTHER PUBLICATIONS

International Search Report & Written Opinion, International Application No. PCT/US2013/021004, dated Apr. 25, 2013, pp. 11.

(Continued)

*Primary Examiner* — Hien L Duong
(74) *Attorney, Agent, or Firm* — Stoel Rives LLP (57) ABSTRACT

A portable electronic device having a touch screen for displaying a soft activation trigger. The soft trigger may be selected via application of a control gesture on the touch screen to configure the electronic device and enable various functions of the electronic device, such as bar code reading and capturing RFID data. The electronic device includes a controller operable to detect a location of the applied control gesture on the touch screen and to automatically adjust a display size and/or location of the activation trigger based on the detected location of the applied control gesture. After prolonged use of the electronic device, the controller may further adjust the display size and position of the activation trigger to position it at a convenient and comfortable position for the operator.

20 Claims, 5 Drawing Sheets

(56) References Cited

U.S. PATENT DOCUMENTS

| | | | |
|---|---|---|---|
| 8,769,431 B1* | 7/2014 | Prasad | G06F 3/048 |
| | | | 715/764 |
| 8,803,814 B2 | 8/2014 | Andolina | |
| 9,098,189 B2* | 8/2015 | Andersson | G06F 3/0237 |
| 2004/0183834 A1 | 9/2004 | Chermesino | |
| 2005/0004844 A1 | 1/2005 | Attia | |
| 2005/0178832 A1 | 8/2005 | Higuchi | |
| 2008/0267537 A1 | 10/2008 | Thuries | |
| 2011/0290871 A1 | 12/2011 | Spencer | |
| 2011/0316797 A1* | 12/2011 | Johansson | G06F 3/04883 |
| | | | 345/173 |
| 2013/0053007 A1 | 2/2013 | Cosman et al. | |
| 2013/0105565 A1 | 5/2013 | Kamprath | |
| 2013/0176264 A1 | 7/2013 | Alameh | |
| 2013/0181050 A1 | 7/2013 | McConnell | |
| 2014/0089831 A1* | 3/2014 | Kim | G06F 3/0481 |
| | | | 715/769 |
| 2014/0109022 A1* | 4/2014 | Wei | G06F 3/04886 |
| | | | 715/863 |
| 2014/0164973 A1* | 6/2014 | Greenzeiger | G06F 3/04886 |
| | | | 715/773 |
| 2014/0204035 A1 | 7/2014 | Chang | |
| 2015/0084877 A1* | 3/2015 | Wang | G06F 3/04883 |
| | | | 345/173 |
| 2015/0153893 A1* | 6/2015 | Park | G06F 3/0488 |
| | | | 345/173 |
| 2015/0193031 A1 | 7/2015 | Tilak et al. | |
| 2015/0294627 A1* | 10/2015 | Yoo | G06F 3/147 |
| | | | 345/690 |
| 2016/0063339 A1* | 3/2016 | Kwon | G06F 3/04817 |
| | | | 382/229 |
| 2016/0202852 A1* | 7/2016 | Park | G06F 3/0488 |
| | | | 715/781 |
| 2016/0328134 A1* | 11/2016 | Xu | G06F 3/0488 |
| 2018/0032239 A1* | 2/2018 | Andersson | G06F 3/04845 |

FOREIGN PATENT DOCUMENTS

| | | |
|---|---|---|
| EP | 2 730 999 A1 | 5/2014 |
| GB | 2 468 891 A | 9/2010 |
| JP | 2005-268627 A | 9/2005 |
| JP | 2005-284639 A | 10/2005 |
| KR | 2006-0103378 A | 9/2006 |
| KR | 2007-0074016 A | 7/2007 |
| KR | 2012-0001164 A | 1/2012 |
| WO | WO 2012-112216 A2 | 8/2012 |

OTHER PUBLICATIONS

Rohs et al., "Using Camera-Equipped Mobile Phones for Interacting with Real-world Objects," 2004.

Yang et al., "A System of QR Barcode Recognition Based on Mobile Phone," Applied Mechanics and Materials 241:1724-1727, 2012.

International Search Report & Written Opinion, International Application No. PCT/US2016/064624, dated Feb. 14, 2017, pp. 12.

* cited by examiner

SIZE ADJUSTABLE SOFT ACTIVATION TRIGGER FOR TOUCH DISPLAYS ON ELECTRONIC DEVICE

BACKGROUND

The field of the disclosure relates generally to systems and methods for capturing and reading data using an electronic device. More particularly, the field of the disclosure relates to such electronic devices with a touch screen interface for automatically and dynamically adjusting a display size of an activation trigger operable to enable various operations of the data reader when the trigger is selected, such as reading optical codes, processing RFID tags, and/or capturing video and images, when the trigger is activated.

Optical reading systems are widely used to read data in the form of optical codes or other encoded symbols printed on various objects. These systems may be used in a wide variety of applications, such as inventory control and point-of-sale transactions in retail stores. Barcodes are just one example of the many types of optical codes in use today. The most common barcodes are one-dimensional or linear optical codes, where the information is encoded in one direction—the direction perpendicular to the bars and spaces. For example, one-dimensional (1D) barcode symbologies may include Code 128, Code 29, Interleaved 2 of 5, matrix 2 of 5, Universal Product Code (UPC), Extended Code 39, Code 93, UCC 128, Codabar, EAN/JAN, MSI, Zip+4, Pharmacode 39, RSS, Standard 2 of 5, Trioptic, DPBC POSTNET. Higher-dimensional optical codes, such as, two-dimensional matrix codes (e.g., MaxiCode) or stacked codes (e.g., PDF 417), which are also sometimes referred to as "two-dimensional barcodes," are also used for various purposes. Based on the type of barcode label that is being used, an appropriate set of decoding parameters is used to accurately read and process the data.

Typically, a one-dimensional barcode label comprises a series of parallel dark bars of varying widths with intervening light spaces, also of varying widths. The information encoded in the barcode label is represented by the specific sequence of bar and space widths. Optical reading systems may employ an optical reader that illuminates the barcode label and detects light reflected from the bars and spaces of the code. One common optical reader is a flying spot scanner in which a source of illumination, such as a laser or LED, is moved across the barcode while a photodetector in the optical reader monitors the reflected or backscattered light. After the barcode data is received by the optical reader, the optical reader may decode the barcode data and store it or transmit it to another device for storage.

Another type of data reader is an imaging reader such as a CCD (charge coupled device) or CMOS (complimentary metal oxide semiconductor) in which an entire line of the barcode image or a two-dimensional image of a scan region is focused onto a detector array. The imaging reader typically includes a light source to illuminate the barcode to provide the required signal response. Once the signal has been received for the entire read region, it may be processed and decoded.

Yet another type of data reader does not use optical barcodes, but instead reads electronic tags using radio waves, such as a radio-frequency identification (RFID) reader. An RFID system typically employs at least two components, a "transponder" or "tag" which is attached to a physical item to be identified, and a "reader" which sends an electromagnetic signal to the transponder and then detects a response. Typically, the reader emits an RF signal, which is received by the transponder, after the transponder comes within an appropriate range. In response, the transponder then sends its information via a modulated RF signal back to the reader. The reader detects this modulated signal, and can identify the transponder by decoding the modulated signal. After identifying the transponder, the reader can either store the decoded information or transmit the decoded signal to a computer or other device.

Currently, data reading and other electronic devices with multiple reading modes and action functions are available, where the devices are capable of capturing and decoding optical barcode labels and RFID tags, and may also have other suitable functions, such as capturing images or videos, providing a screen to capture signatures, and/or enabling voice or texting options. Such electronic devices may be useful in an environment where objects may contain mixed barcode symbology and RFID tags, such as in a retail store or packaging facility, or where there is a need for a multi-purpose electronic device that may also capture images or videos, or provide features for enabling phone calls or other functions.

Typically, such electronic devices include a physical trigger button arranged on the housing of the device to activate some device functions, and also include separate individual buttons or selectable icons for enabling and activating other functions of the electronic device. The present inventor has recognized certain disadvantages of such electronic devices. For example, providing a physical button or trigger on a touch screen electronic device tends to restrict the easy handheld use of the device and/or requires the device to be used in a specific orientation. In addition, a physical trigger button adds to the bulk and size of the device. Moreover, the position of the physical button on the data reader may be inconvenient for some users, such as users with smaller hands, or users that may be left-handed or right-handed.

Accordingly, the present inventor has recognized a need for an electronic reader device that includes a soft activation trigger selectable by touching a display of the reader device to quickly and easily enable a scanning or other function of the reader device. In addition, the present inventor has recognized a need for such a reader device where a display size and position of the activation trigger is automatically adjustable and adaptive to a particular operator to optimize a display area of the electronic reader device. Additional aspects and advantages of these and other embodiments will be apparent from the following detailed description, which proceeds with reference to the accompanying drawings. It should be understood that the drawings depict only certain example embodiments and are not to be considered as limiting in nature.

DETAILED DESCRIPTION OF PREFERRED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Certain embodiments may be capable of achieving various advantages, including one or more of the following: (1) providing a portable electronic device with touch screen capabilities for quickly and easily activating various reader functions; (2) providing an adaptable portable electronic device capable of responding to individual operator feedback to automatically adjust a display size and location of an activation trigger for improving comfort and use; and (3) a portable electronic device capable of presenting an individualized activation trigger to accommodate the ergonomic needs of a variety of operators.

In the following description of the figures and any example embodiments, the system may be referred to in conjunction with use at a retail establishment. It should be understood that such use is merely one example use for such a system. Other uses for a system with the characteristics and features described herein may be implemented, for example, in an industrial location such as a parcel distribution (e.g., postal) station or for processing inventory, as well as other suitable uses. In addition, certain embodiments may refer to the portable electronic device as a data reader operable for capturing barcodes or RFID data from items. It should be understood that this is merely one example embodiment and use of a portable electronic device with the features and functionalities described herein. In other embodiments, the portable electronic device may be used for other purposes, such as for recording and processing videos or images, taking/obtaining pictures, for handling and processing insurance claims, documenting and handling service and repair issues, opening any application or menu, being used as a virtual joystick in a gaming or other application, and other suitable uses.

Collectively, FIGS. 1-7 illustrate various embodiments of a portable electronic device 100 that may be used to read and process an optical label or RFID tag on an item during a checkout process, such as at a retail store or supermarket. The portable electronic device 100 includes a touch screen 112 that may display information 150 thereon, such as application icons, images, text, or other suitable information. Along with the information 150, the touch screen 112 additionally displays a soft activation trigger 175 that is selectable by an operator via application of force on the touch screen 112 (such as by using a finger or stylus instrument). Selection of the activation trigger 175 configures an action of the electronic device 100, such as activating a reading process for capturing data. It should be understood that while the written description may focus on one embodiment where the activation trigger 175 is selectable to activate a reading process for capturing data using the portable electronic device 100, this is merely one example used in the written description for convenience purposes only. In other embodiments, the activation trigger 175 may be selectable to configure any other action of the portable electronic device 100, such as to activate a video recording mode, open an application or menu, input actions for a gaming application, call up a product directory, or any other suitable use.

Figure 2:
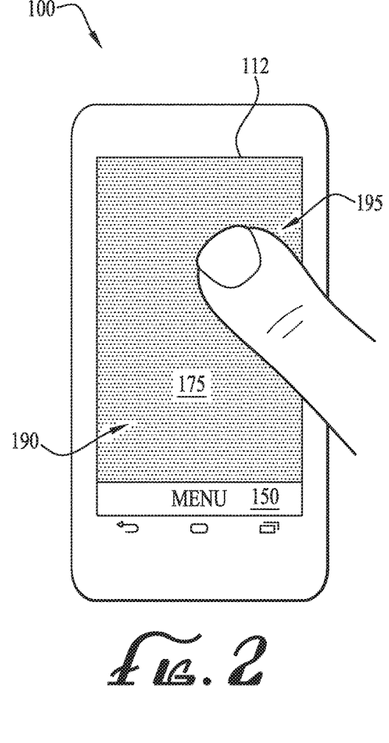
FIG. 2 is a view of a portable electronic device illustrating a selectable activation trigger overlaying a portion of the touch screen display, according to one embodiment.
Figures 6A, 6B:
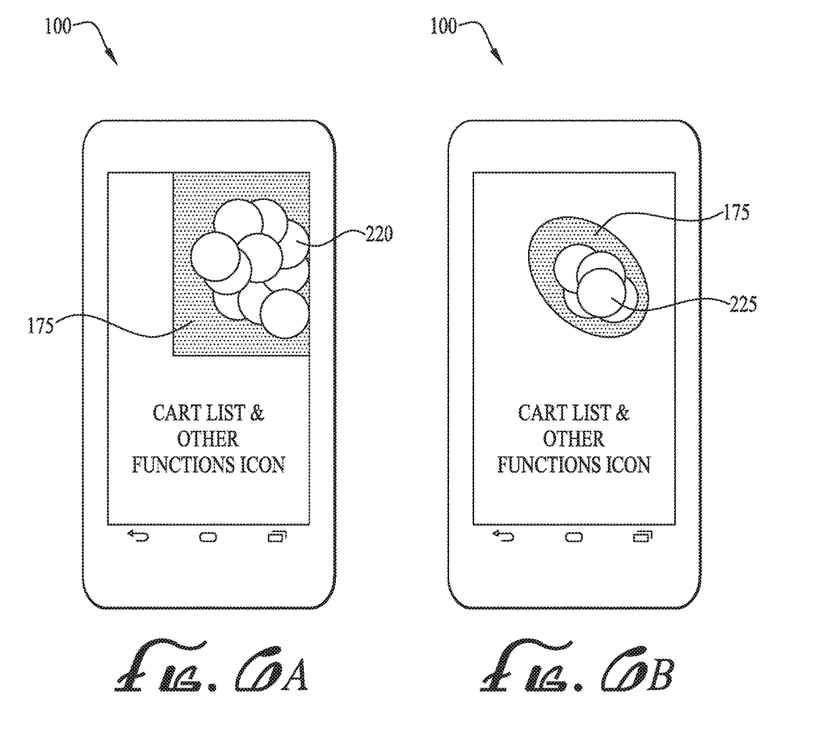
FIGS. 6A and 6B are views of the portable electronic device of FIG. 2 illustrating a refinement process for automatically adjusting a display size of the trigger based on operator precision during use.

As illustrated in FIG. 2, the activation trigger 175 may initially overlay a substantial portion of the visible touch screen 112. To initiate the reading process, an operator touches the touch screen 112 at a position displaying the activation trigger 175. With particular reference to FIGS. 6A and 6B, over the course of multiple uses, the electronic device 100 determines an operator's favored position based on a concentration of activation points 220, 225 provided on the touch screen 112 during use of the electronic device 100. As the activation points 220, 225 become more concentrated, the activation trigger 175 dynamically and automatically overlays successively smaller portions of the touch screen 112 corresponding to the concentration of activation points 220, 225. After a number of uses, the size and position of the trigger 175 is configured for the individual operator. The remaining portions of the touch screen 112 may be used to present other data, such as a transaction list, product information, an indication whether the scan was successful, or other suitable data. Additional details of these and other embodiments of the electronic device 100 are described herein with reference to the figures.

Figure 1:
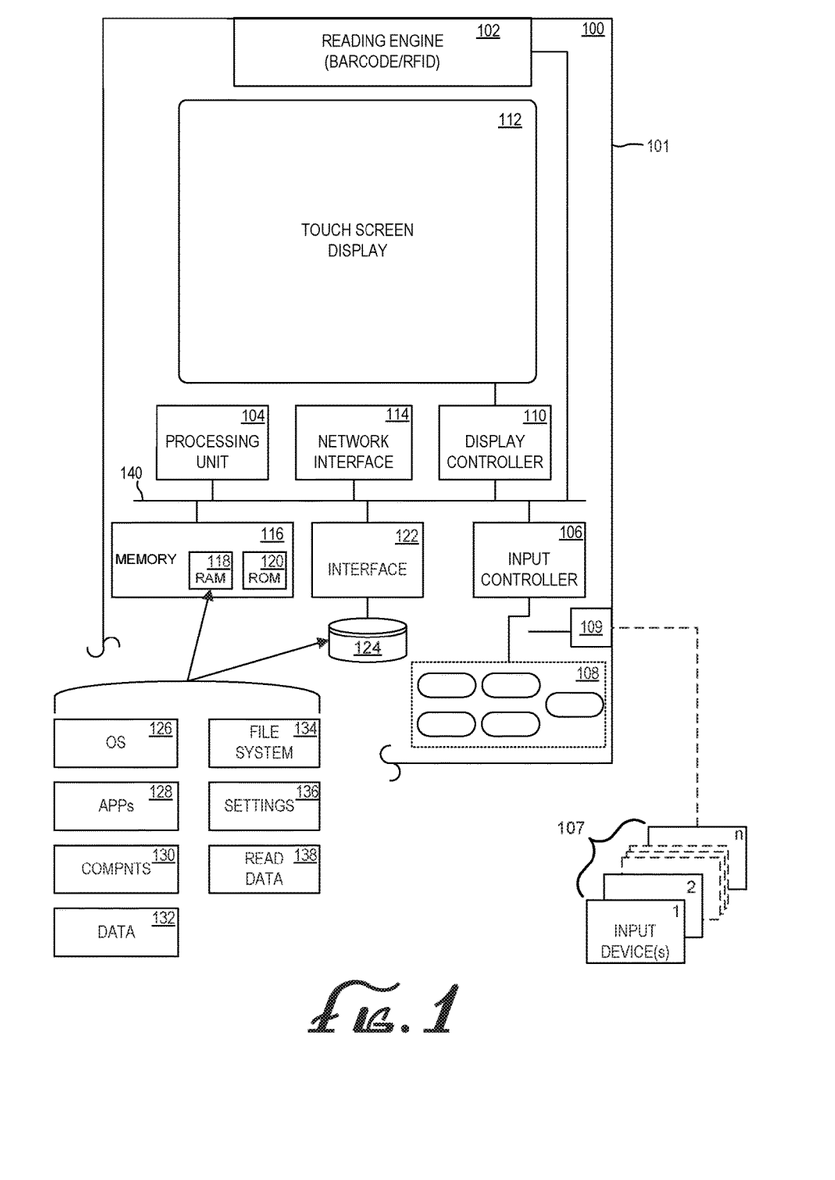
FIG. 1 is a block diagram of a portable electronic device with a touch screen display, according to one embodiment.

FIG. 1 illustrates a block diagram of the portable electronic device 100, such as a barcode reader, RFID reader, industrial Portable Data Terminal, mobile phone, tablet, or a multi-mode data reader (a multi-mode data reader being capable of reading optical codes, RFID tags, and other data types), according to one embodiment. With reference to FIG. 1, the electronic device 100 includes a housing 101 suitable for protecting components (as discussed in detail below) of the electronic device 100 therein and for supporting additional components, such as a keyboard 108 and a touch screen 112, on an exterior surface of the housing 101. The housing 101 is preferably compact and suited for portability and hand-held operation of the electronic device 100.

The portable electronic device 100 may include one or more reading engines 102, such as an optical label (or barcode) scanning engine, an RFID reading engine, or a multi-mode data reader capable of reading both/multiple data types. The reading engine 102 may read barcode symbols from a physical object, capture information from an RFID tag, and process captured images or other data when the electronic device 100 is activated. In some example embodiments, the reading engine 102 may include a laser barcode scan engine available from Datalogic ADC, Inc. or other manufacturers. In other embodiments, the reading engine 102 may include an RFID reading engine available from Datalogic ADC, Inc., or other manufacturers. As used herein, reading engines 102 may also encompass laser scanners, imaging scanners (such as CMOS or CCD-based imagers), cameras, and/or image sensors.

The portable data reader 100 may include a processing unit 104. The processing unit 104 may be any of various suitable commercially available processors or other logic machine capable of executing instructions. In other embodiments, suitable dual microprocessors or other multi-processor architectures may also be employed as the processing unit 104.

A standard input controller 106 may be provided to receive user input from a keyboard/keypad 108, a stylus or other pointing device (not shown), or other wired/wireless input devices. The input controller 106 may comprise a universal interface driver application specific integrated circuit (UIDA) or other suitable circuits. In some embodiments, other input devices 107 may be included, such as a microphone, digital camera, fingerprint scanner, touchpad, trackball, and tablet. While the input devices 107 may be integrated into the portable electronic device 100 and coupled to the processing unit 104 via the input controller 106, the input devices 107 may also connect via other interfaces, such as one or more connector(s) 109. The connector 109 may include one or more data interfaces, bus interfaces, wired or wireless network adapters, or modems for transmitting and receiving data. Accordingly, the input controller 106 may include one or more of hardware, software, and firmware to implement one or more protocols, such as stacked protocols along with corresponding layers, such as for example application layers (e.g., HTTP), transport layers (e.g., TCP), network layers (e.g., IP), and link layers (e.g., Ethernet). According to one embodiment, the connector 109 functions as a serial port (e.g., RS232). However, the connector 109 may also support other interfaces, such as a Universal Serial Bus (USB) port, an Ethernet port, a parallel port, an IEEE 1394 serial port, or an IR interface. The input controller 106 may also support various wired, wireless, optical, and other communication standards.

The portable electronic device 100 includes a display controller 110 that drives the touch screen 112 and controls display features, such as to present data, prompts, and otherwise communicate with an operator via the touch screen 112. The display controller 110 may also control presentation and other features relating the activation trigger 175. In some embodiments, the display controller 110 may alter the appearance and/or color of the activation trigger 175 to indicate whether a particular action was successful or not. For example, in a data reading operation, the display controller 110 may alter a display color of the activation trigger 175 to indicate a good read (e.g., the tickets are for the correct date and time) or a bad read (e.g., the tickets are for a different event). The activation trigger 175 may be displayed in green to indicate a good read, or in red to indicate a bad read.

The touch screen 112 may be any one of a variety of display types, such as an integrated liquid crystal display (LCD), an organic light-emitting diode (OLED), or other suitable display with touch screen capabilities. The portable electronic device 100 may include one or more sensors (not shown) for detecting the operator's touch via a finger, stylus, or other device on the touch screen 112.

Anyone of a variety of suitable touch screen technologies may be used to determine a position of the operator's touch on the touch screen 112. For example, in one embodiment, the portable electronic device 100 may include an array of indium tin oxide (ITO) sensor traces arranged in an X-Y grid pattern. When the operator touches the touch screen 112, particular sensor traces detect a change in capacitance, and the processing unit 104 (and/or the display controller 110), resolves the change in capacitance to determine the location of touch (i.e., an X-Y coordinate) on the array of sensor traces. In another embodiment, a small voltage may be applied along the corners of the touch screen 112 to create a uniform electric field. When an operator touches the touch screen 112, the current is drawn from each corner of the electric field to create a voltage drop, which is used by the controller unit 104 (and/or the display controller 110) to determine the location of touch. In other embodiments, other suitable touch screen technologies may be used to determine a location of touch on the touch screen 112.

The portable electronic device 100 may also include a network interface 114 to communicate with one or more other devices, such as a server, a host computer, or a point-of-sale terminal via an external network (not shown). For example, data gathered by, or decoded by, the portable electronic device 100 may be passed along to a server. The network interface 114 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radio frequency identification (RFID). In addition, a modem module (not shown) or Ethernet module (not shown) may be coupled to the connector 109 to facilitate a WAN networking environment.

The portable electronic device 100 further includes a memory 116, which may be implemented using one or more standard memory devices. The memory devices may include, for instance, RAM 118, ROM 120, and EEPROM devices, and may also include magnetic or optical storage devices, such as hard disk drives, CD-ROM drives, and DVD-ROM drives. The portable electronic device 100 may also include an interface 122 coupled to an internal hard drive 124. Interface 122 may also be coupled to removable memory, such as flash memory, a magnetic floppy disk drive, an optical disk drive, or another drive. Further, the interface 122 (and/or input controller 106) may be configured for external drive implementations, such as over a USB, IEEE 1194, or PCMCIA connection.

In one embodiment, any number of program modules may be stored in one or more drives 124 and RAM 118, including an operating system 126, one or more application programs 128, other program modules/components 130 (such as instructions to implement the methods described herein), data 132, file system 134, settings 136, and read data 138. All or portions of the program modules may also be cached in RAM 118. Any suitable operating system 126 may be employed, such as Windows Embedded CE, Windows Embedded Handheld, Windows Desktop, Android, Linux, iOS, MacOS, or other commercially available or proprietary operating systems capable of supporting a touch screen interface.

The memory 116, the internal hard drive 124, or both, may also store a number of settings 136 for the portable electronic device 100, which may include various symbology settings, device settings (e.g., user-interface), and network settings. Additionally, the memory 116, the internal hard drive 124, or both, may store read data 138 (e.g., symbols and information read from barcodes and RFID tags) obtained by the reading engine 102, images captured using the electronic device 100, or other data. Any of the foregoing may be stored within, or indexed by, a file system 134, which may be managed by the operating system 126.

The above-described components, including the reading engine 102, processing unit 104, input controller 106, display controller 110, network interface 114, memory 116, and interface 122, may be interconnected via a bus 140. While a bus-based architecture is illustrated in FIG. 1, other types of architectures are also suitable (e.g., one or more components may be directly coupled to one another). While the illustrated embodiment depicts one possible configuration of a portable electronic device 100, it should be recognized that a wide variety of hardware and software configurations may be provided. For example, other versions of the portable electronic device 100 may have fewer than all of these components or may contain additional components.

FIGS. 2-7 collectively illustrate various example embodiments and uses of the electronic device 100. With reference to the figures, the following sections discuss additional features and functions of the electronic device 100, and its example use as a data reading device, such as to read optical codes and/or RFID tags from items in a retail establishment. In certain example embodiments, the following disclosure may provide examples regarding locations of specific touch gestures to activate a reading mode or other function of the electronic device 100. As mentioned previously, it should be understood that these examples are for illustration purposes only and not meant to limit the scope of the disclosure. As further described in detail below, the touch gestures and functions of the device 100 may be programmed in a variety of configurations as desired by a specific user.

With general reference to FIGS. 2-5, the electronic device 100 includes a touch screen 112 having a display field/area 190 that presents information 150 thereon, such as application icons, images, text, or other suitable information. Along with the information 150, the display field/area 190 also displays a soft activation trigger 175 that is selectable to activate the data reading functionality of the electronic device 100 when the trigger 175 is selected. As illustrated in the figures, the activation trigger 175 may be a single solid color region presented on the touch screen 112. In some embodiments, the trigger 175 may include displayed text, such as SCAN, to indicate to the operator a touch region for activating the electronic device 100. The appearance of the trigger 175 may take any one of a variety of suitable shapes, such as a circle, a square region, a star region, or other suitable shape, including such shapes that may be selected/programmed by the user. Preferably, the trigger 175 is of a shape and color that stands out against the desktop or interface display of the touch screen 112 so that it is easily identifiable and accessible by the operator.

In some embodiments, the appearance and/or color of the trigger 175 may change as the information 150 on the touch screen 112 changes so that the trigger 175 appears as the dominant feature in the display area 190 of the touch screen 112. For example, the display controller 110 may determine a color and/or appearance of the trigger 175 based on the primary color(s) and/or appearance(s) of the information 150 displayed on the touch screen 112. If the information 150 is primarily displayed in brighter colors, the display controller 110 may select a darker color for the trigger 175 or vice versa. In other embodiments, the display controller 110 may limit or restrict the color(s) and/or appearance(s) of the icons and other information 150 on the touch screen 112 to reserve specific colors/appearances for the trigger 175.

In other embodiments, the trigger 175 may instead be transparent or semi-transparent so that it partially obscures the desktop or interface display of the touch screen 112 to allow the operator to view any underlying information 150 to facilitate operation of the device 100. In such embodiments, the trigger 175 may be hidden, shrunk, and/or moved to expose the underlying icons or other information 150 on the touch screen 112 to allow the operator to perform other actions using the electronic device 100. In addition, the trigger 175 may also be moved or enlarged to improve comfort and use of the electronic device 100 as further described below with reference to FIGS. 3-5.

As is described in further detail below, a position and display size of the trigger 175 (i.e., the size of the trigger 175 as displayed on the touch screen 112) may be automatically determined by the electronic device 100 in accordance with specific tendencies/behaviors employed by the operator when using the electronic device 100 to provide a comfortable location for the trigger 175. In this way, the electronic device 100 is capable of being customized to satisfy the needs for each individual operator/user as is further described below.

For example, with reference to FIG. 2, prior to use of the electronic device 100 for data reading, such as immediately after powering up the device 100, the trigger 175 may be displayed in an initial position at which the trigger 175 accounts for a substantial portion of the display field/area 190 of the touch screen 112. In some embodiments, this arrangement may be most convenient as an initial position since during a typical shopping application, there may be no need to display other features, such as information 150, on the touch screen 112 because no items have been processed and the shopping cart is otherwise empty. Accordingly, an operator can apply a touch gesture at any portion of the display field 190 to activate the scanning function of the device 100.

In other embodiments, a portion of the display field 190 may present information 150, such as menu options, and the trigger 175 may instead be initially positioned on a free region or free space of the touch screen 112 (i.e., a region where no other information 150 is displayed). In such embodiments, the display controller 110 (or other system of the electronic device 100) may evaluate the pixel usage of the display field 190 or the touch screen 112 based on the information 150 displayed thereon. Based on the pixel usage, the display controller 110 determines a portion of the display field/area 190 on the touch screen 112 for displaying the trigger 175, and displays the trigger 175 to maintain it at a position where it is easily accessible for the operator while still allowing the operator to access the information 150 or other features of the electronic device 100 if needed. The display controller 110 may periodically reevaluate the pixel usage of the touch screen 112 and reposition the trigger 175 automatically in response to changes in the position of the information 150 as described further. In still other embodiments, the operator may program the display controller 110 or other controller of the electronic device 100 to set default location preferences for the soft trigger 175.

Figure 3:
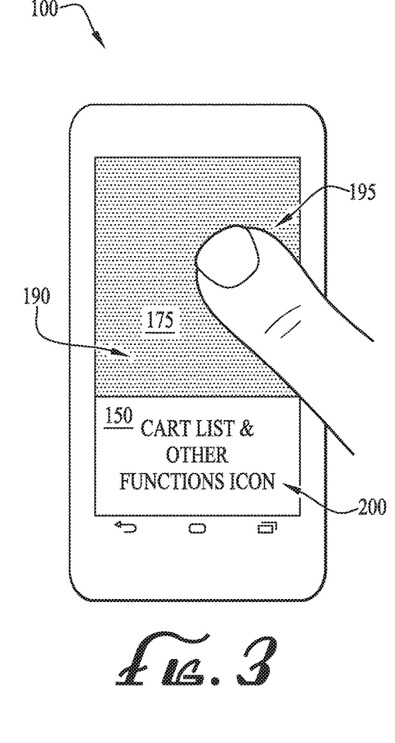
FIGS. 3-5 are views of the portable electronic device of FIG. 2 illustrating an iterative refinement process for automatically adjusting a display size of the selectable trigger to overlay successively smaller portions of the touch screen display after multiple uses.

As noted previously, at first scan, the operator may apply a control gesture (e.g., a touch via a finger or stylus instrument) virtually anywhere on the touch screen 112 since the trigger 175 accounts for a substantial portion, or the entirety, of the display field 190. With reference to FIG. 3, after the first scan event (i.e., after the operator initially touches the trigger 175 on the touch screen 112 to operate the electronic device 100) the controller 104 (and/or the display controller 110) may determine a position/location of the operator's touch on the display field 190. Based on the position of the operator's first touch, the controller 104 (and/or the display controller 110) adjusts a display size and position of the trigger 175 accordingly. For example, the operator may have initially touched the trigger 175 along an upper portion or region 195 of the display field 190 (see FIG. 2). In response to the position of the first touch, the controller 104 (and/or the display controller 110) may adjust (i.e., alter or reduce) the display size of the trigger 175 and display the trigger 175 on the upper portion 195 of the display field 190 coinciding with a region of the first touch as illustrated in FIG. 3. The trigger 175, with its new adjusted size and position, may be displayed on an upper portion 195 of the touch screen 112. In the this example, the lower portion 200 (which was not touched by the operator) of the display field 190 no longer displays a portion of the trigger 175 and the scan function is no longer operable by touching the lower portion 200 of the display field 190. Instead, the lower portion 200 may display other information 150, such as information that may relate to the transaction or other options of the electronic device 100. In other embodiments, the lower portion 200 may instead display no information.

Figure 4:
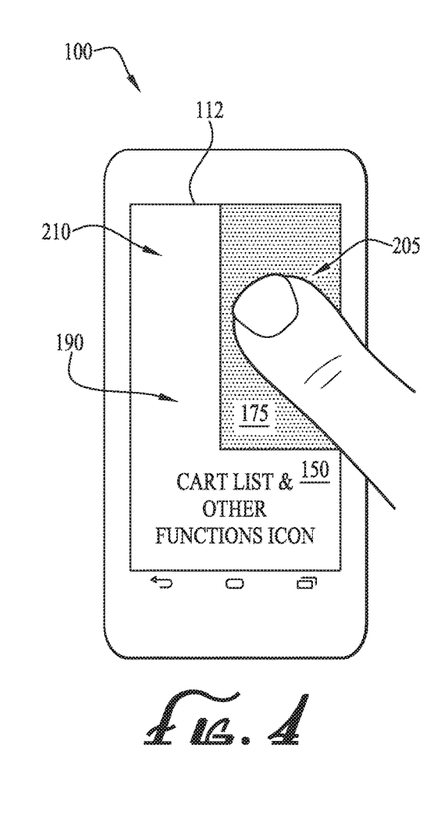

With reference to FIGS. 3 and 4, after initiating another scan event by a second touch of the display area 190 coinciding with a position of the size-adjusted trigger 175 (as in FIG. 3), the controller 104 determines a position of the second touch on the touch screen 112. In a similar fashion as described above, in accordance with the determined position of the second touch, the controller 104 readjusts a display size of the trigger 175 to correspond to a location of both the first and second touches on the touch screen 112. In readjusting the size of the trigger 175 in response to the second touch, the controller 104 considers the position of both the first touch and the second touch so that the readjusted trigger 175 is based on a location of both the first and second touches.

For example, with reference to FIG. 4, the second touch may be in the same general location as the first touch. Accordingly, the controller 104 may reduce the display size and position of the trigger 175 so that it accounts for a right-hand quadrant 205 of the upper portion 195. After the first two touches, the controller 104 determines that the operator does not prefer the left-hand quadrant 210 since that region has not yet been touched to activate the electronic device 100. Accordingly, the trigger 175 no longer encompasses the left-hand quadrant 210, leaving that region to be used to display other information 150 or instead display nothing.

Figure 5:
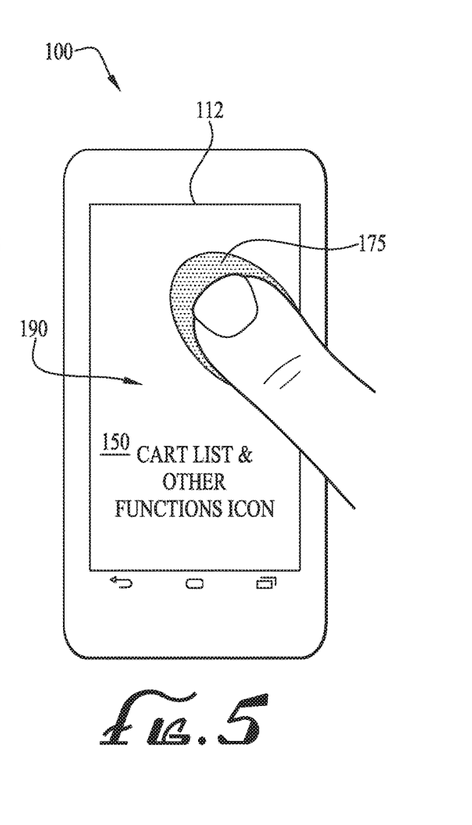

With reference to FIG. 5, after a number of iterations similar to those described in FIGS. 2-4 have been completed, the controller 104 may further refine the display size and position of the trigger 175 so that the trigger 175 is displayed at a location on the touch screen 112 that is most often used by the operator. This final display size and position accounts for the first, second, third, and subsequent touches on the touch screen 112. In this fashion, the controller 104 determines a convenient location to display the trigger 175 so that its placement coincides with a general region or area that the operator tends to use most frequently. Preferably, when the device 100 is powered off and powered on again, the display size and position of the trigger 175 remains unchanged. In other embodiments, as described below, the configurations and parameters of the trigger 175 may be saved/loaded for individual operators prior to use to avoid having to configure the electronic device 100 prior to all uses.

During use of the electronic device 100, each particular operator may have different precision/accuracy in selecting the trigger 175 during the described iterative learning process of the electronic device 100 so that a final size and position of the trigger 175 may be different for each user. For example, FIGS. 6A and 6B collective illustrate example embodiments where the operator is less precise (FIG. 6A) and more precise (FIG. 6B), thereby resulting in triggers 175 having different display sizes in accordance with the precision of the operator.

With reference to FIG. 6A, a plurality of activation points 220 illustrate that the operator generally activated the trigger 175 along an upper portion of the display area 190. Based on the generally loose clustering of the activation points 220, the processor 104 determined that a slightly larger (as compared to FIG. 6B discussed below) trigger 175 would be most convenient for this particular operator to accommodate the various touch locations. On the other hand, with reference to FIG. 6B, the activation points 225 for this particular operator are fairly tightly clustered around a particular region of the display area 190. Accordingly, the processor 104 determined an appropriately sized trigger 175 for this particular operator, which is smaller than the operator illustrated in FIG. 6A. As mentioned previously, in some embodiments, the iterative learning process may continue until the controller 104 has obtained sufficient data to determine a final display size/position of the trigger 175.

In some embodiments, after the iterative learning process has been completed, the electronic device 100 may allow an operator to select and move the trigger 175 and/or adjust a size of the trigger 175 as desired. For example, in some embodiments, the trigger 175 may be selected and moved from a first region on the touch screen 112 at which the trigger 175 is displayed to a different second region of the touch screen 112. In one example operation, the trigger 175 may be selected by applying a first control gesture (e.g., a touch and hold), and then dragged on the touch screen 112 to the second region by applying a second control gesture (e.g., a drag motion). These control gestures may be performed to move the trigger 175 to a different location such as to allow unrestricted access to the underlying information 150, or to reposition the trigger 175 to a more desirable/convenient location to facilitate comfortable operability of the electronic device 100.

In other embodiments, the display size of the trigger 175 may be enlarged or shrunk by applying a control gesture to the touch screen 112. For example, in one embodiment, the operator may select the trigger 175 on the touch screen 112 and expand the borders of the trigger 175 such as by spreading his or her fingers until the trigger 175 reaches a desired size, or shrink the trigger 175 by narrowing the fingers. In still other embodiments, the iterative learning process may continue indefinitely, with the processor 104 constantly determining whether to adjust a display size and position of the trigger 175 based on continued use of the electronic device 100.

As mentioned previously, a preferred display size and location of the trigger 175 may be created for each particular operator of the device 100 to provide a more comfortable and personalized experience. In some embodiments, this information may be saved in the memory 116 of the electronic device 100, or stored on a local or cloud server, so that the operator can access and load a preferred configuration without having to undergo the iterative process prior to subsequent uses. For example, an operator may create a user profile/account and save a preferred configuration for the trigger 175. Accordingly, prior to use of the electronic device 100, the operator can log in to the account and load the preferred configuration for use. In other embodiments, the operator may identify himself or herself on the device 100 using other methods. For example, the operator may swipe a retail fidelity card or an employee card, enter an ID and password, or apply a fingerprint, retinal scan, or other biometric password.

In some embodiments, the operator may associate specific configurations of the trigger 175 based on different tasks to be completed. For example, for use in a retail setting, the operator may prefer the trigger 175 in one particular position to accommodate this particular use of the device 100. However, for use in an inventory setting, the operator may prefer the trigger 175 at a different position and perhaps displayed smaller to provide additional room on the touch screen 112 for displaying other items of interest, such as inventory lists or other information. Each of these preferred settings may be stored for the particular operator and loaded onto the device 100 prior to use, such as by selecting a particular operation via a menu displayed on the touch screen 112.

Figure 7:
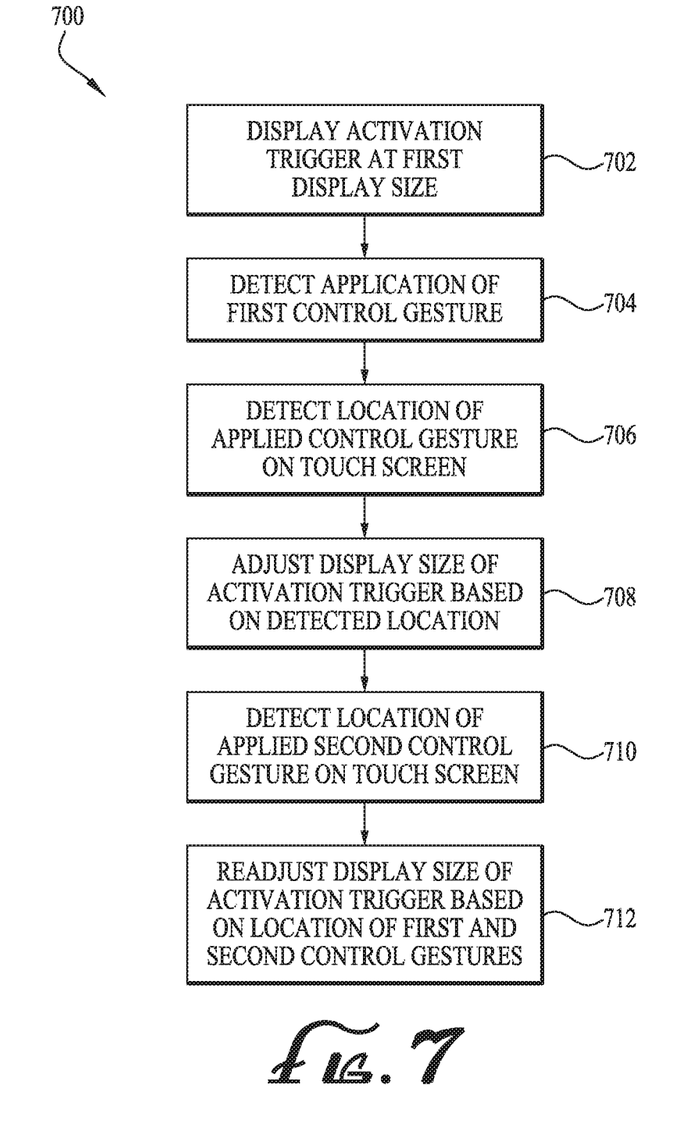
FIG. 7 is a flow chart illustrating a method for automatically adjusting the size and position of the trigger of the portable electronic device, according to one embodiment.

FIG. 7 is a flow chart illustrating an iterative learning process/method 700 performed by the portable electronic device 100 according to one embodiment. It should be understood that while the description of the method steps may present and describe certain steps in a particular order, the order is for convenience and is not meant to be limiting. In some embodiments, the steps may be performed in an order different than what is specified herein. In addition, the method may include additional steps and features other than those included herein. In some embodiments, the method may combine certain steps or omit certain steps altogether.

With reference to FIG. 7, at step 702, the electronic device displays an activation trigger at a first display size and location on the touch screen. As mentioned previously, the display size of the activation trigger may account for a substantial portion of the display area of the touch screen prior to a first scanning event. At step 704, the electronic device detects a first control gesture (such as via a finger or stylus instrument) applied on the display area corresponding to a location of the activation trigger. Applying the control gesture to the touch screen activates the trigger to configure the electronic device. At step 706, the controller (or other component) of the electronic device determines a location of the first control gesture on the touch screen. In some embodiments, the controller may store the location information relating to the first touch in system memory or another memory module.

At step 708, the controller adjusts a display size and/or location of the trigger based on the location of the first control gesture on the touch screen. During a subsequent use of the electronic device, the operator applies a second control gesture to activate the trigger for a second reading event. At step 710, the controller detects a location of the second control gesture applied on the display area, which corresponds to a location of the adjusted trigger. Thereafter, at step 712, the controller readjusts the display size and/or position of the activation trigger on the touch screen based on the detected locations of both the first and second control gestures. Preferably, the adjusted size and position of the activation trigger after the second scanning event is smaller in comparison with the initial size of the activation trigger.

As mentioned previously, the iterative learning process may continue for as many steps as desired to further refine/adjust the display size and location of the activation trigger. For example, in some embodiments, steps 710 and 712 may be repeated during a third scanning event, with the controller analyzing whether to readjust the size and location of the activation trigger based on the location of the first, second, and third control gestures. In other embodiments, steps 710 and 712 may be repeated continuously without end, with the controller determining whether to readjust the size and location of the activation trigger after each scanning event (or other activation event in cases where the portable device is used for purposes other than scanning). In still other embodiments, steps 710 and 712 may be repeated continuously, but the controller may determine whether to readjust the size and location of the activation trigger based on a selected sample size. For example, the controller may consider the last five or ten activation events on a rolling basis in adjusting the size of the activation trigger on the display. In this fashion, the electronic device may determine a suitable display size and location for the activation trigger based on the use and tendencies for each individual operator.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An electronic device comprising:
   a housing adapted for handheld operation;
   a touch screen supported on the housing, the touch screen displaying a first activation trigger at a first display size within a first region of the touch screen, wherein the first activation trigger is selectable to activate an operating mode of the electronic device via application of a first control gesture at the first region of the touch screen at which the first activation trigger is displayed; and
   a controller in communication with the touch screen, the controller operable to:
      detect a location of the first control gesture applied at the first region of the touch screen;
      determine a first activation point corresponding to the detected location of the first control gesture applied at the first region;
      adjust the first display size of the first activation trigger based on the detected location of the first activation point, thereby resulting in an adjusted second activation trigger having a second display size different from the first display size;
      display the adjusted second activation trigger at the second display size within a second region of the touch screen, wherein the adjusted second activation trigger is selectable to activate the operating mode of the electronic device via application of a second control gesture;
      detect a location of the second control gesture applied at the second region of the touch screen;
      determine a second activation point corresponding to the detected location of the second control gesture applied at the second region;
      determine a concentration location of the first and second control gestures based on the corresponding detected locations of the first and second activation points;
      adjust the second display size of the adjusted second activation trigger thereby resulting in an adjusted third activation trigger having a third display size different from both the first and second display sizes; and
      display the adjusted third activation trigger at the third display size within a third region of the touch screen, wherein a location of the third region of the touch screen is based on the concentration location of the first and second control gestures, and wherein the adjusted third activation trigger is selectable to activate the operating mode of the electronic device via application of a third control gesture.

2. The electronic device of claim 1, wherein the second display size of the adjusted second activation trigger is smaller than the first display size of the first activation trigger.

3. The electronic device of claim 1, wherein the third display size of the adjusted third activation trigger is smaller than the second display size of the adjusted second activation trigger, and wherein the display size of the adjusted third activation trigger is further based on the concentration location of the first and second control gestures.

4. The electronic device of claim 1, wherein the controller is further operable to:
 detect a location of the third control gesture applied at the third region of the touch screen;
 determine a third activation point corresponding to the detected location of the third control gesture applied at the third region;
 determine a concentration location of the first, second, and third control gestures based on the corresponding detected locations of the first, second, and third activation point;
 adjust the third display size of the adjusted third activation trigger thereby resulting in an adjusted fourth activation trigger having a fourth display size different from each of the first, second, and third display sizes; and
 display the adjusted fourth activation trigger at the fourth display size within a fourth region of the touch screen, wherein a location of the fourth region of the touch screen is based on the concentration location of the first, second, and third control gestures, and wherein the adjusted fourth activation trigger is selectable to activate the operating mode of the electronic device via application of a fourth control gesture.

5. The electronic device of claim 1, further comprising a memory module, wherein the memory module is operable to store display parameters relating to the second display size of the adjusted second activation trigger within the second region of the touch screen, the memory module being accessible via the electronic device to display the adjusted second activation trigger in accordance with the display parameters.

6. The electronic device of claim 1, wherein the adjusted second activation trigger is movable from within the second region of the touch screen to a different fourth region of the touch screen.

7. The electronic device of claim 1, further comprising:
 a data capture engine associated with both the first activation trigger and the adjusted second activation trigger; and
 wherein the controller configures the electronic device with the data capture engine in response to the controller detecting application of the first control gesture.

8. The electronic device of claim 7, wherein the adjusted second activation trigger is selectable to configure the data capture engine via application of a second control gesture at the second region of the touch screen at which the adjusted second activation trigger is displayed.

9. The electronic device of claim 1, further comprising a memory module configured to store a preferred display size of the activation trigger for each of one or more individual operators, wherein the controller is in communication with the memory module and further configured to query the memory module to determine whether a select operator from the one or more individual operators has an associated preferred display size stored in the memory module, and to display the activation trigger at the preferred display size for the select operator.

10. The electronic device of claim 1, wherein the first control gesture and the second control gesture are different from one another.

11. A method of capturing data with an electronic device, the method comprising:
 displaying, via an electronic device having a touch screen, a first activation trigger at a first display size within a first region of the touch screen, the first activation trigger being selectable to activate an operating mode of the electronic device via application of a first control gesture at the first region;
 determining, via a controller, whether the first control gesture has been applied at the first region of the touch screen at which the activation trigger is displayed;
 detecting, via the controller, a location of the first control gesture applied at the first region of the touch screen;
 determining, via the controller, a first activation point corresponding to the detected location of the first control gesture applied at the first region;
 adjusting, via the controller, the first display size of the first activation trigger based on the detected location of the first activation point, thereby resulting in an adjusted second activation trigger having a second display size;
 displaying, via the controller, the adjusted second activation trigger at the second display size within a second region of the touch screen, wherein the adjusted second activation trigger is selectable to activate the operating mode of the electronic device via application of a second control gesture;
 detecting, via the controller, a location of the second control gesture applied at the second region of the touch screen;
 determining, via the controller, a second activation point corresponding to the detected location of the second control gesture applied at the second region;
 determining, via the controller, a concentration location of the first and second control gesture based on the corresponding detected locations of the first and second activation points
 adjusting, via the controller, the second display size of the adjusted second activation trigger thereby resulting in an adjusted third activation trigger having a third display size different from both the first and second display sizes; and
 displaying, via the controller, the adjusted third activation trigger at the third display size within a third region of the touch screen, wherein a location of the third region of the touch screen is based on the concentration location of the first and second control gesture, and wherein the adjusted third activation trigger is selectable to activate the operating mode of the electronic device via application of a third control gesture.

12. The method of claim 11, wherein the second display size of the adjusted second activation trigger is smaller than the first display size of the first activation trigger.

13. The method of claim 11, wherein the third display size of the adjusted third activation trigger is smaller than the second display of the adjusted second activation trigger, and wherein the display size of the adjusted third activation trigger is further based on the concentration location of the first and second control gestures.

14. The method of claim 11, wherein the second adjusted activation trigger is selectable via application of a third control gesture at the third region, the method further comprising:
- detecting, via the controller, a location of the third control gesture applied at the third region of the touch screen;
- determining, via the controller, a third activation point corresponding to the detected location of the third control gesture applied at the third region;
- determining, via the controller, a concentration location of the first, second, and third control gestures based on the corresponding detected location of the first, second, and third activation points;
- adjusting, via the controller, the third display size of the adjusted third activation trigger thereby resulting in an adjusted fourth activation trigger having a fourth display size different from each of the first, second, and third display sizes; and
- displaying, via the controller, the adjusted fourth activation trigger at the fourth display size within a fourth region of the concentration location of the first, second, and third control gestures, and wherein the adjusted fourth activation trigger is selectable to activate the operating mode of the electronic device via application of a fourth control gesture.

15. The method of claim 11, further comprising storing, via a memory module, display parameters relating to the first display size of the adjusted second activation trigger within the second region of the touch screen, the memory module being accessible via the electronic device to display the adjusted second activation trigger at the second display size in accordance with the display parameters.

16. The method of claim 11, further comprising moving, via the controller, the adjusted second activation trigger within the second region of the touch screen to a different fourth region of the touch screen in response to a second control gesture.

17. The method of claim 11, further comprising:
- associating, via the controller, a data capture engine with both the first activation trigger and the adjusted second activation trigger;
- determining, via the controller, application of the first control gesture; and
- configuring, via the controller, the electronic device with the data capture engine in response to the controller detecting application of the first control gesture.

18. The method of claim 17, wherein the adjusted second activation trigger is selectable via application of a second control gesture at the second region, the method further comprising:
- determining, via the controller, application of the second control gesture; and
- configuring, via the controller, the electronic device with the data capture engine in response to the controller detecting application of the second control gesture.

19. The method of claim 11, further comprising:
- storing, via a memory module, a preferred display size of the activation trigger for each one of one or more individual operators;
- associating, via the controller, the stored preferred display size of the activation trigger with each one of the one or more individual operators;
- receiving, via the controller, identification information for a select operator of the one or more individual operators;
- querying, via the controller, the memory module to determine whether the select operator has an associated preferred display size stored in the memory module; and
- displaying, via the controller, the activation trigger at the preferred display size on the touch screen for the select operator.

20. The method of claim 11, wherein the first control gesture and the second control gesture are different from one another.

* * * * *